United States Patent [19]

Oguchi

[11] Patent Number: 4,943,801

[45] Date of Patent: Jul. 24, 1990

[54] GRAPHICS DISPLAY CONTROLLER EQUIPPED WITH BOUNDARY SEARCHING CIRCUIT

[75] Inventor: Tetsuji Oguchi, Tokyo, Japan

[73] Assignee: NEC Corporation, Tokyo, Japan

[21] Appl. No.: 161,690

[22] Filed: Feb. 29, 1988

[30] Foreign Application Priority Data

Feb. 27, 1987 [JP] Japan .................................. 62-44840

[51] Int. Cl.$^5$ ............................................. G09G 1/00
[52] U.S. Cl. .................................. 340/723; 340/747; 340/799; 382/22; 382/48
[58] Field of Search ............... 340/703, 720, 723, 724, 340/728, 747, 798, 799; 358/96; 382/22, 48

[56] References Cited

U.S. PATENT DOCUMENTS

| | | | |
|---|---|---|---|
| 4,425,559 | 1/1984 | Sherman | 340/747 |
| 4,481,594 | 11/1984 | Staggs et al. | 340/703 |
| 4,623,880 | 11/1986 | Bresenham et al. | 340/747 |
| 4,646,076 | 2/1987 | Wiedenman et al. | 340/703 |
| 4,648,045 | 3/1987 | Demetrescu | 340/799 |
| 4,656,507 | 4/1987 | Greaves et al. | 358/96 |
| 4,667,306 | 5/1987 | Smith | 340/724 |
| 4,677,574 | 6/1987 | Kausch | 340/747 |
| 4,763,119 | 8/1988 | Matsubara et al. | 340/728 |
| 4,791,582 | 12/1988 | Ueda et al. | 340/747 |
| 4,805,127 | 2/1989 | Hata et al. | 340/723 |
| 4,817,184 | 3/1989 | Thomason et al. | 382/22 |
| 4,823,282 | 4/1989 | Yamagami | 340/747 |

OTHER PUBLICATIONS

Simmons et al.; "Polygon Filling in Graphics Display System"; IBM Technical Disclosure Bulletin; vol. 24 No. 1A; Jun. 1981.

Van Wyk; "Clipping to the Boundary of a Circular-Arc Polygon"; Computer Vision, Graphics, and Image Processing; Mar. 1984; pp. 383-392.

Primary Examiner—David K. Moore
Assistant Examiner—Richard Hjerpe
Attorney, Agent, or Firm—Sughrue, Mion, Zinn, Macpeak & Seas

[57] ABSTRACT

A graphics display controller equipped with a boundary search circuit is disclosed. There is provided a mask information generator generating mask information consisting of a plurality of bits in response to control data, at least one bit of the mask information taking non-mask data and the remaining bits thereof taking mask data. Each bit data of the mask information is supplied to the associated one of a plurality of mask gates along with the associated bit data of display data of one word read from a display memory. Each of the mask gates outputs the associated bit data of the display data when the associated mask information bit data is the non-mask data. The output data of the mask gates are supplied to a position information generator wherein the position information relative to a position of a bit taking a predetermined logic level is generated.

8 Claims, 9 Drawing Sheets

| IN \ OUT | $X_0$(LSB) — — — — — — — $X_{15}$(MSB) |
|---|---|
| 0 | 1111 1111 1111 1111 |
| 1 | 0111 1111 1111 1111 |
| 2 | 0011 1111 1111 1111 |
| 3 | 0001 1111 1111 1111 |
| 4 | 0000 1111 1111 1111 |
| 5 | 0000 0111 1111 1111 |
| 6 | 0000 0011 1111 1111 |
| 7 | 0000 0001 1111 1111 |
| 8 | 0000 0000 1111 1111 |
| 9 | 0000 0000 0111 1111 |
| A | 0000 0000 0011 1111 |
| B | 0000 0000 0001 1111 |
| C | 0000 0000 0000 1111 |
| D | 0000 0000 0000 0111 |
| E | 0000 0000 0000 0011 |
| F | 0000 0000 0000 0001 |

ROM 1

FIG. 3B

| IN \ OUT | $Y_0$(LSB) — — — — — — — $Y_{15}$(MSB) |
|---|---|
| 0 | 1000 0000 0000 0000 |
| 1 | 1100 0000 0000 0000 |
| 2 | 1110 0000 0000 0000 |
| 3 | 1111 0000 0000 0000 |
| 4 | 1111 1000 0000 0000 |
| 5 | 1111 1100 0000 0000 |
| 6 | 1111 1110 0000 0000 |
| 7 | 1111 1111 0000 0000 |
| 8 | 1111 1111 1000 0000 |
| 9 | 1111 1111 1100 0000 |
| A | 1111 1111 1110 0000 |
| B | 1111 1111 1111 0000 |
| C | 1111 1111 1111 1000 |
| D | 1111 1111 1111 1100 |
| E | 1111 1111 1111 1110 |
| F | 1111 1111 1111 1111 |

ROM 2

FIG. 5

(LEFT-DIRECTION 1←0 SEARCH)

| INPUT 5-00 ---------------- 5-150 | | BOUNDARY POSITION | FORWARD | BACK |
|---|---|---|---|---|
| (LSB) | (MSB) | | | |
| XXXXXXX | XXXXXX1 | 0 | 0 | 1 |
| XXXXXXX | XXXXX10 | 15 | 0 | 0 |
| XXXXXXX | XXXX100 | 14 | 0 | 0 |
| XXXXXXX | XXX1000 | 13 | 0 | 0 |
| XXXXXXX | XX10000 | 12 | 0 | 0 |
| XXXXXXX | X100000 | 11 | 0 | 0 |
| XXXXXXX | 1000000 | 10 | 0 | 0 |
| XXXXXXX | 10000000 | 9 | 0 | 0 |
| XXXXXX1 | 00000000 | 8 | 0 | 0 |
| XXXXX10 | 00000000 | 7 | 0 | 0 |
| XXXX100 | 00000000 | 6 | 0 | 0 |
| XXX1000 | 00000000 | 5 | 0 | 0 |
| XX10000 | 00000000 | 4 | 0 | 0 |
| X100000 | 00000000 | 3 | 0 | 0 |
| 1000000 | 00000000 | 2 | 0 | 0 |
| 10000000 | 00000000 | 1 | 0 | 0 |
| 00000000 | 00000000 | 0 | 1 | 0 |

FIG.6

(RIGHT-DIRECTION 0→1 SEARCH)

| INPUT 5-00 ---------- 5-150 | | BOUNDARY POSITION | FORWARD | BACK |
|---|---|---|---|---|
| (LSB) | (MSB) | | | |
| 00000000 | 00000001 | 14 | 0 | 0 |
| 00000000 | 0000001X | 13 | 0 | 0 |
| 00000000 | 000001XX | 12 | 0 | 0 |
| 00000000 | 00001XXX | 11 | 0 | 0 |
| 00000000 | 0001XXXX | 10 | 0 | 0 |
| 00000000 | 001XXXXX | 9 | 0 | 0 |
| 00000000 | 01XXXXXX | 8 | 0 | 0 |
| 00000000 | 1XXXXXXX | 7 | 0 | 0 |
| 0000001 | XXXXXXX | 6 | 0 | 0 |
| 0000001X | XXXXXXX | 5 | 0 | 0 |
| 000001XX | XXXXXXX | 4 | 0 | 0 |
| 00001XXX | XXXXXXX | 3 | 0 | 0 |
| 0001XXXX | XXXXXXX | 2 | 0 | 0 |
| 001XXXXX | XXXXXXX | 1 | 0 | 0 |
| 01XXXXXX | XXXXXXX | 0 | 0 | 0 |
| 1XXXXXXX | XXXXXXX | 15 | 0 | 1 |
| 00000000 | 00000000 | 0 | 1 | 0 |

FIG. 7

( LEFT-DIRECTION 0→1 SEARCH )

| INPUT 5-00 ————————— 5-150 | | BOUNDARY POSITION | FORWARD | BACK |
|---|---|---|---|---|
| (LSB) | (MSB) | | | |
| XXXXXXXX | XXXXXXX0 | 15 | 0 | 0 |
| XXXXXXXX | XXXXXX01 | 14 | 0 | 0 |
| XXXXXXXX | XXXXX011 | 13 | 0 | 0 |
| XXXXXXXX | XXXX0111 | 12 | 0 | 0 |
| XXXXXXXX | XXX01111 | 11 | 0 | 0 |
| XXXXXXXX | XX011111 | 10 | 0 | 0 |
| XXXXXXXX | X0111111 | 9 | 0 | 0 |
| XXXXXXXX | 01111111 | 8 | 0 | 0 |
| XXXXXXX0 | 11111111 | 7 | 0 | 0 |
| XXXXXX01 | 11111111 | 6 | 0 | 0 |
| XXXXX011 | 11111111 | 5 | 0 | 0 |
| XXXX0111 | 11111111 | 4 | 0 | 0 |
| XXX01111 | 11111111 | 3 | 0 | 0 |
| XX011111 | 11111111 | 2 | 0 | 0 |
| X0111111 | 11111111 | 1 | 0 | 0 |
| 01111111 | 11111111 | 0 | 0 | 0 |
| 11111111 | 11111111 | 0 | 1 | 0 |

FIG.8

(RIGHT-DIRECTION 1→0 SEARCH)

| INPUT 5-00 ---------------- 5-150 | | BOUNDARY POSITION | FORWARD | BACK |
|---|---|---|---|---|
| (LSB) | (MSB) | | | |
| 11111111 | 11111110 | 15 | 0 | 0 |
| 11111111 | 1111110X | 14 | 0 | 0 |
| 11111111 | 111110XX | 13 | 0 | 0 |
| 11111111 | 11110XXX | 12 | 0 | 0 |
| 11111111 | 1110XXXX | 11 | 0 | 0 |
| 11111111 | 110XXXXX | 10 | 0 | 0 |
| 11111111 | 10XXXXXX | 9 | 0 | 0 |
| 11111111 | 0XXXXXXX | 8 | 0 | 0 |
| 11111110 | XXXXXXXX | 7 | 0 | 0 |
| 1111110X | XXXXXXXX | 6 | 0 | 0 |
| 111110XX | XXXXXXXX | 5 | 0 | 0 |
| 11110XXX | XXXXXXXX | 4 | 0 | 0 |
| 1110XXXX | XXXXXXXX | 3 | 0 | 0 |
| 110XXXXX | XXXXXXXX | 2 | 0 | 0 |
| 10XXXXXX | XXXXXXXX | 1 | 0 | 0 |
| 0XXXXXXX | XXXXXXXX | 0 | 0 | 0 |
| 11111111 | 11111111 | 0 | 1 | 0 |

GRAPHICS DISPLAY CONTROLLER EQUIPPED WITH BOUNDARY SEARCHING CIRCUIT

BACKGROUND OF THE INVENTION

The present invention relates to a graphics display controller which controls a display memory to display figures on a display screen of a raster scan cathode-ray tube, and more particularly to a boundary searching circuit provided in such a controller to determine a boundary of an area to be painted.

One of various functions performed by a graphics display controller is to paint or fill a closed area with a certain color or with an arbitrary pattern. To this end, it is required to search or determine a boundary of the area to be painted. Since each picture element on a display screen corresponds to each bit in a display memory, the boundary of the painting area is searched by detecting the data of the display memory. The boundary searching is executed in general in accordance with the following procedure:

(1) A searching start bit is given at random and the data of this searching start bit is detected. If data "1", for example, is stored in the searching start bit, this bit is regarded as being outside the area to be painted and the boundary searching is terminated. A new searching start bit is thus given.

(2) On the other hand, in case where the data stored at the searching start bit is data "0", detection is made to search whether or not a bit storing data "1" is present between the searching start bit and a left-end bit of a first word including the searching start bit. If the presence of such a bit is detected, a left-hand boundary of the area to be painted is determined.

(3) In case where the presence of such a bit is not detected, a second word adjacent leftward to the first word is read out and detection is made to search whether or not this second word includes a bit storing data "1". If the second word does not includes such a bit, a third word adjacent leftward to the second word is read out and the data of each bit of the third word is detected. The same processing operation is repeated until a bit storing data "1" is detected. Thus, the left-hand boundary of the area to be painted is searched.

(4) Next, the searching of a right-end boundary of the area is carried out, by detecting whether or not a bit storing data "1" is present between the searching start bit and a right-end bit of the first word. If the presence of such a bit is not detected, a fourth word adjacent rightward to the first word is read out and the data thereof is judged to detect whether or not the fourth word includes a bit stored with data "1". The same processing operation is executed until a bit stored with data "1" is detected. Thus, a right-hand boundary of the area to be painted is searched.

Since the above-mentioned first to fourth words are arranged in one horizontal line on the display screen, the left-hand boundary searching and the right-hand boundary searching are performed with respect to other words arranged in other horizontal lines on the display screen. Thus, the boundary of the area to be painted is searched.

According to prior art, the data of each word is detected one bit by one bit by use of a bit-shift instruction. For this reason, a very long processing time is required. For example, in case where 1000 bits are present between the left-hand boundary and the right-hand boundary, the bit-shift instruction and the data detecting operation are executed 1000 times.

SUMMARY OF THE INVENTION

Therefore, an object of the present invention is to provide a graphics display controller equipped with a boundary searching circuit which searches the boundary of an area to be painted at a high speed.

Another object of the present invention is to provide a boundary searching circuit in which the boundary of an area to be painted is detected without using a bit-shift instruction.

A graphics display controller according to the present invention comprises means responsive to control data for generating mask information consisting of N bits (N being an integer more than (1) in which M bits has mask data (M being zero to N−1), means for reading display data consisting of N bits from a display memory, means supplied with the mask information and the display data for outputting data of the bit or bits of the display data corresponding to the bit or bits of the mask information which do not have the mask data, means responsive to the outputted data for generating bit position information relative to a position of the bit having data of a predetermined logic level.

The control data designates the number of bits having the mask data and/or the position thereof in the mask information. In a processing operation of a first word including a searching start bit, first mask information is generated in which all bits except for the bit of a position corresponding to the position of the searching start bit take the mask data. Accordingly, only the data of the searching start bit is supplied to the bit position information generating means. If the data of the searching start bit is the predetermined logic level, "1" for example, the information is generated which represents that the boundary searching operation is to be terminated. On the other hand, in case where the data of the searching start bit is "0", a left-direction boundary searching operation starts. Second mask information is thus generated in which at least the right-end bit to the associated bit with the searching start bit take the mask data. Therefore, the data from the left-end bit to the bit adjacent leftward to the searching start bit in the first word are supplied to the bit position information generating means, and if the data "1" is present among them, the position information relative to the bit stored with the data "1" is obtained. When the data "1" is not present, a second word adjacent leftward to the first word is read from the display memory, and third mask information is generated in which all the bits do not mask data. The data of all bits of the second word are supplied to the bit position information generating means. If the second word includes a bit stored with the data "1", the position information relative to the position of that bit is obtained. In case where the bit of data "1" is not present in the second word, a third word adjacent leftward to the second word is read out. No bit of the mask information takes the mask data. When a left-hand boundary is detected, a right-hand boundary searching operation is executed similarly. Thus, the boundary of the area to be painted is searched for a short time.

BRIEF DESCRIPTION OF THE DRAWINGS

The above and other objects, advantages and features of the present invention will be more apparent from the following description taken in conjunction with the accompanying drawings, in which.

DETAILED DESCRIPTION OF THE INVENTION

Figure 1:
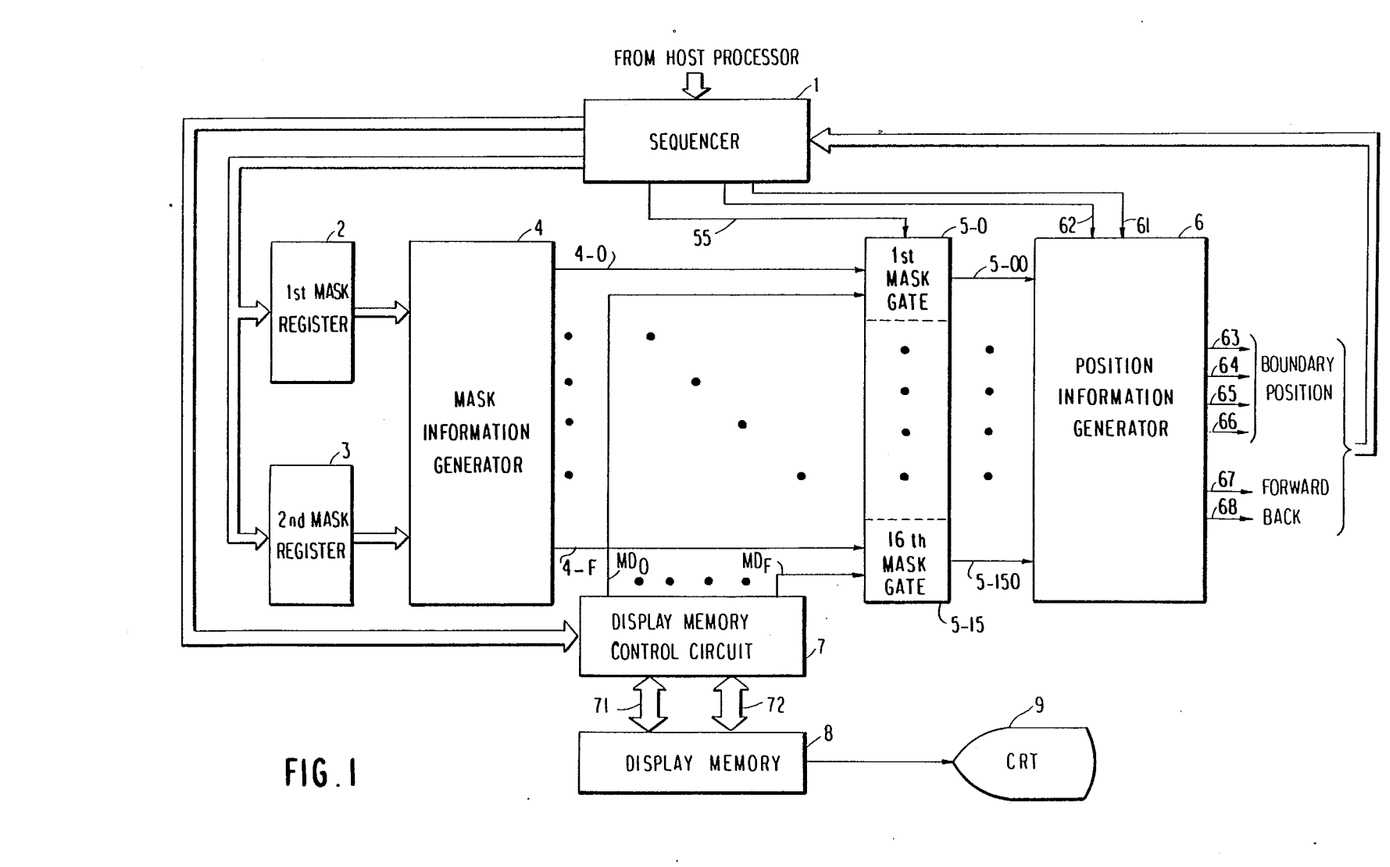
FIG. 1 is a block diagram representative of an embodiment of the present invention.
Figure 10A:
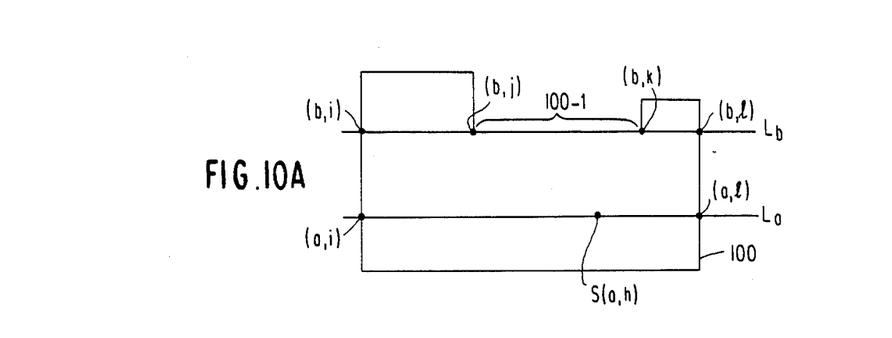
FIGS. 10A, 10B, 10C and 10D are a pattern diagram showing an example of a figure, a data map in a line $L_a$ of a painting area, a data map in a line $L_b$ of the painting area and a plan view of the painting area, respectively.
Figure 10B:
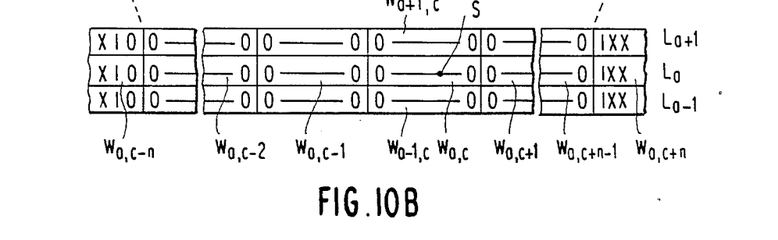
Figure 10C:
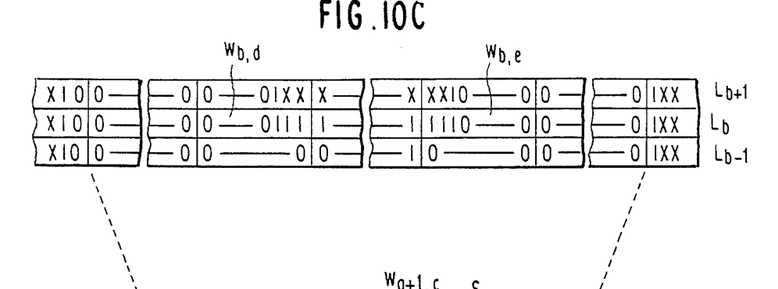
Figure 10D:
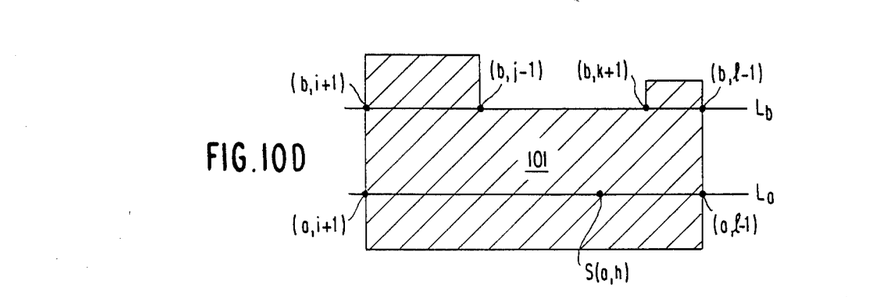

Referring to FIG. 1, a graphics display controller according to an embodiment of the present invention includes a sequencer 1 and a display memory control circuit 7, for controlling a display memory 8 to display figures and/or characters on a display screen of a raster scan type cathode-ray tube (CRT) 9. Each bit in the display memory 8 represents each picture element on the screen of the CRT 9. Sixteen bits constitute one word in the memory 8. It is assumed that the memory 8 stores a figure 100 as shown in FIG. 10A, which is displayed on the screen of CRT 9, and the sequencer 1 receives an instruction from a host processor (not shown) to "paint", or fill, the closed area of the figure 100 with a certain color or with a number of small patterns. At first, a boundary of the painting area 101 as shown in FIG. 10D should be determined. It is defined by such addresses that are one-bit inside the addresses of the boundary of the figure 100 to be painted and it is determined by use of a boundary searching circuit according to the present invention, which includes first and second mask registers 2 and 3, a mask information generator 4, first to sixteenth mask gates 5-0 to 5-15 and a position information generator 6.

Turning back to FIG. 1, the sequence 1 further receives information representative of a search-starting bit from the host processor. Then, the sequence 1 instructs the display memory controller 7 to read a word including the search-starting bit from the display memory 8. The display memory controller 7 thereby outputs to an address bus 71 address information for accessing the word including the search-start bit and reads the data of the word from the display memory 8 via a data bus 72. The sixteen bits data $MD_0$ to $MD_F$ of the read-out word are supplied to the first to sixteenth mask gates 5-0 to 5-15, respectively. The sequencer 1 further writes control data representative of a position of the search-start bit into both of the first and second mask registers 2 and 3. Since one word of the display memory 8 consists of sixteen bits, the control data written into the mask registers 2 and 3 consists of four bits. The contents of the registers 2 and 3 are supplied to the mask information generator 4.

Figure 2:
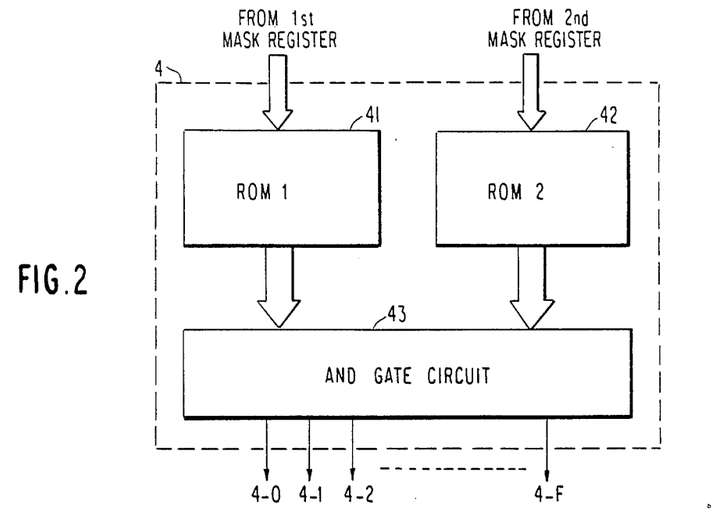
FIG. 2 is a block diagram of a mask information generator shown in FIG. 1.
Figure 3A:
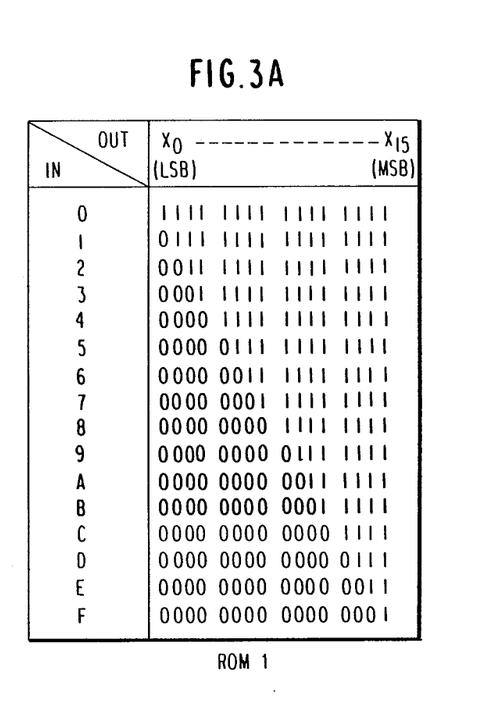
FIGS. 3A and 3B are table diagrams representative of input and output data relationships of mask ROM's shown in FIG. 2, respectively.
Figure 3B:
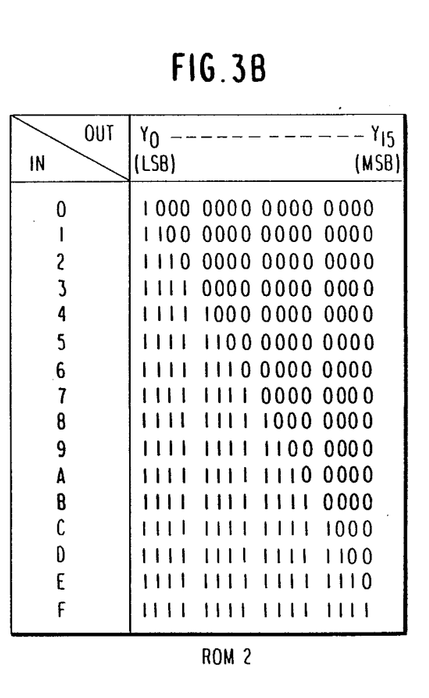

Referring to FIG. 2, the mask information generator 4 includes first and second ROMs (read only memories) 41 and 42 and an AND gate circuit 43 consisting of sixteen AND gates (not shown). The content of the first mask register 2 is supplied to the first ROM 41 as first address information thereto, and the content of the second mask register 3 is supplied to the second ROM 4 as second address information thereto. Each of the first and second address information takes one of sixteen address data "0" to "F". The first ROM 41 generates sixteen output patterns in response to the address data "0" to "F", respectively, as shown in FIG. 3A. The second ROM 42 generates sixteen output patterns in response to the address data "0" to "F", respectively, as shown in FIG. 3B. Each of the output patterns generated from the ROMs 41 and 42 consists of sixteen bits $X_0$ to $X_{15}$ and $Y_0$ to $Y_{15}$. The outputs $X_0$ to $X_{15}$ from the first mask ROM 41 are supplied to first input terminals of the sixteen AND gates in the circuit 43, respectively, and the outputs $Y_0$ to $Y_{15}$ from the second mask ROM 42 are supplied to second input terminals of the AND gates, respectively. Thus, the AND gate circuit 43 generates mask information consisting of sixteen bits 4-0 to 4-F. Assuming that the position data of the search-start bit is "A", the output of first ROM 41 is "0000 0000 0011 1111" and that of the second ROM 42 is "1111 1111 1110 0000". Therefore, the data of the least significant bit 4-0 through the most significant bit 4-F of the mask information are "0000 0000 0010 0000", as apparent from FIGS. 3A and 3B. That is, all the bits 4-0 to 4-9 and 4-B to 4-F except the 11th bit 4-A take mask data "0" and only the 11th bit 4-A takes non-mask data "1". The bit data 4-0 to 4-F of the mask information are supplied to the mask gates 5-0 to 5-15, respectively.

Figure 4:
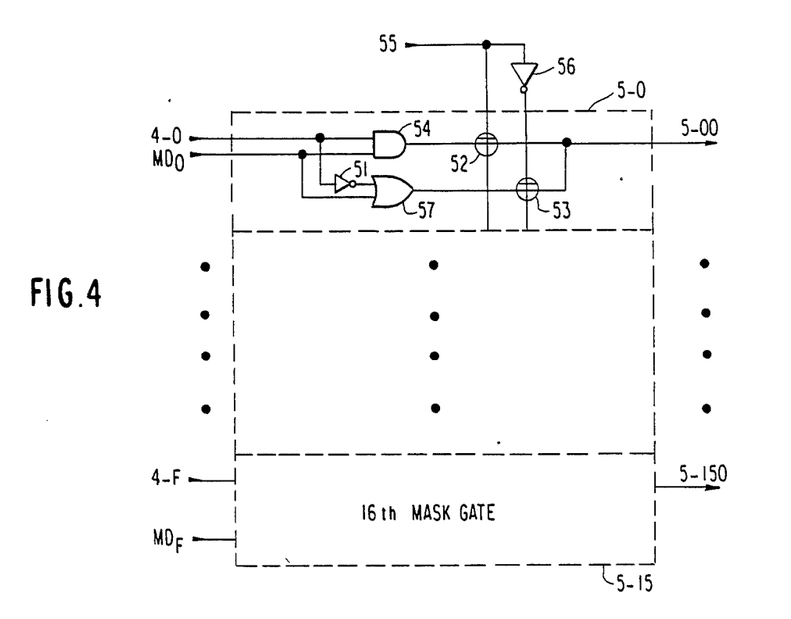
FIG. 4 is a circuit diagram of each of mask gates shown in FIG. 1.

Referring to FIG. 4, each of the mask gates 5-0 to 5-15 includes an AND gate 54, an inverter 51, two transfer gates 52 and 53 and an OR gate 57 which are connected as shown. The transfer gates 52 and 53 are controlled by a logic control signal 55 supplied from the sequencer 1. The transfer gate 52 receives the control signal 55 as it is and the gate 53 receives the inverted signal of the control signal 55 by an inverter 56. Therefore, when the logic control signal 55 takes logic "1", the transfer gate 52 is opened and the gate 53 is closed. When the signal 55 takes logic "0", the gate 52 is closed and the gate 53 is opened. In the data detecting operation of the searching start bit, the logic control signal 55 takes logic "1". Assuming that the position of the searching start bit is "A" and the data thereof is "1", only the Ath mask gate output 5-100 among mask gate outputs 5-00 to 5-150 takes logic "1" and all of the remaining outputs take logic "0". The mask gate outputs 5-00 to 5-150 are supplied to the position information generator 6.

The position information generator 6 receives searching-direction control (designation) data 61 and 62 and generates at a set of first output terminals 63 to 66 boundary position information represents which bit among the mask gate outputs 5-00 to 5-150 takes "1" or "0". The generator 6 further generates forward information at a second output terminal 67 and back information at a third output terminal 68. The forward information represents that the boundary is present in a word which will be thereafter processed, and the back information represents that the boundary is present in a word which was processed just therebefore. These boundary position information 63 - 66, forward information 67 and back information 68 are supplied to the sequencer 1. The position information generator 6 is constructed as shown in FIG. 5 by means of a PLA (programmable logic array) technique.

Figure 5:
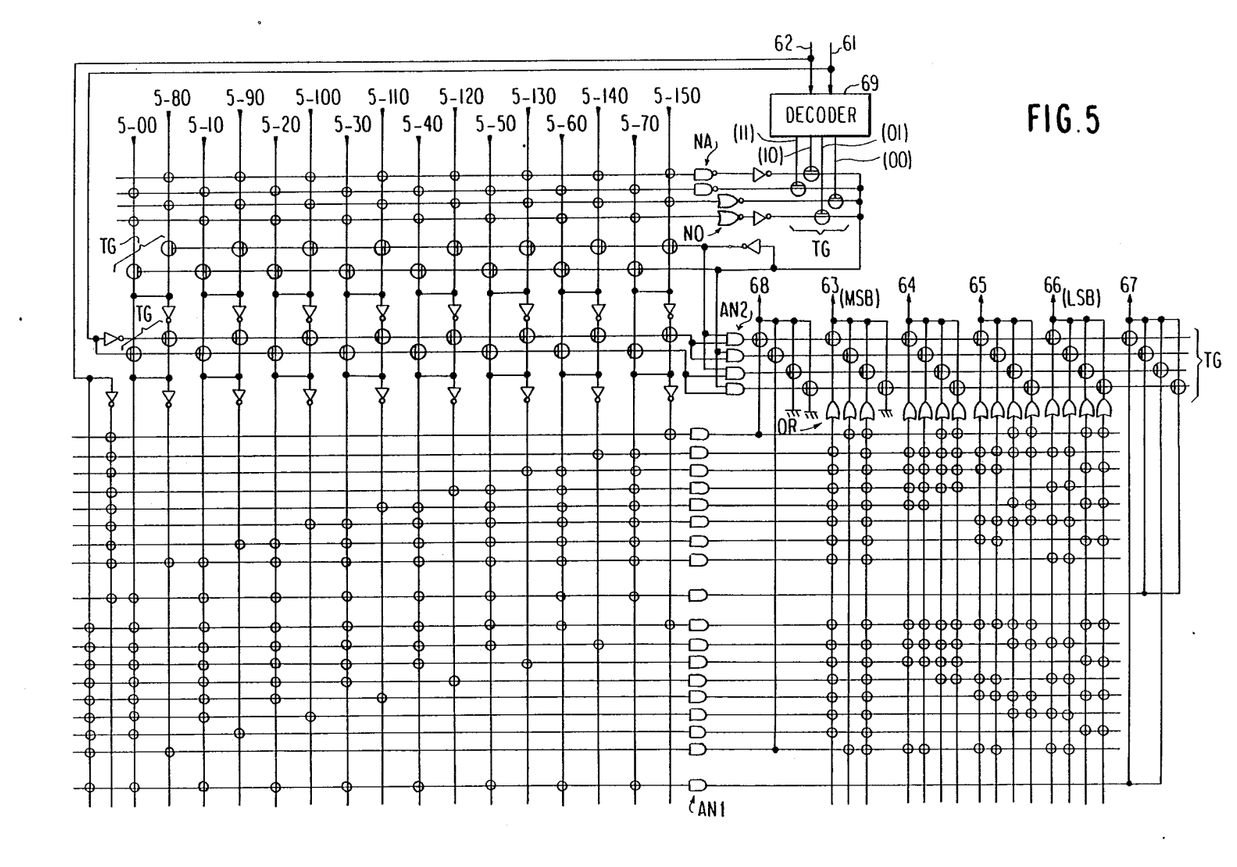
FIG. 5 is a circuit diagram of a position information generator shown in FIG. 1.
Figure 6:
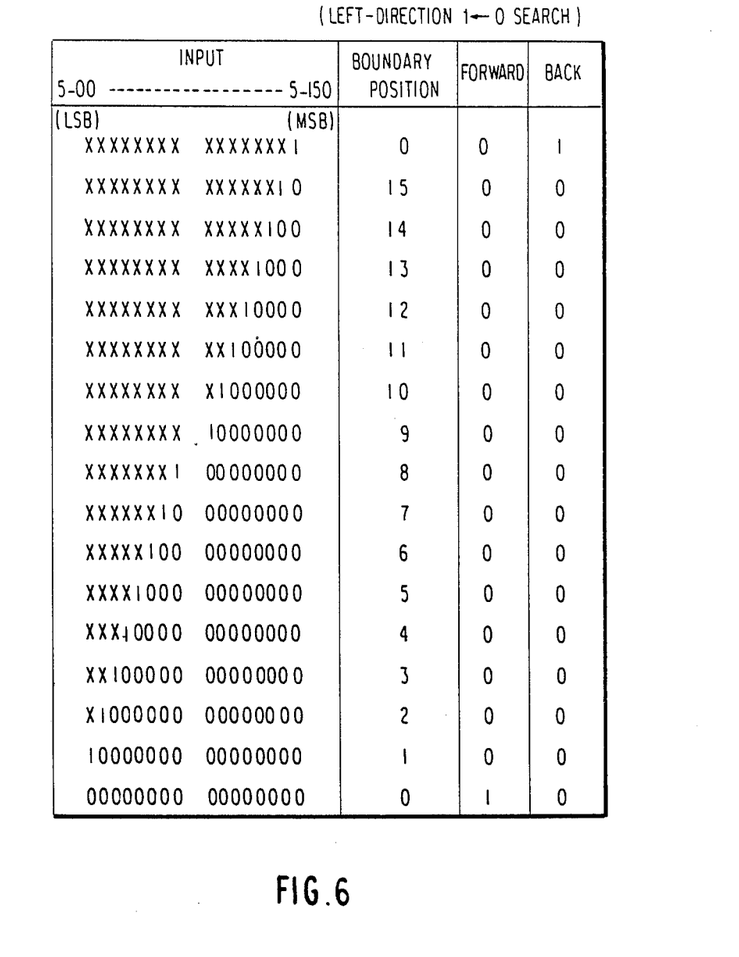
FIG. 6, FIG. 7, FIG. 8 and FIG. 9 are table diagrams representative of input and output data relationships of the position information generator shown in FIG. 1, respectively.
Figure 7:
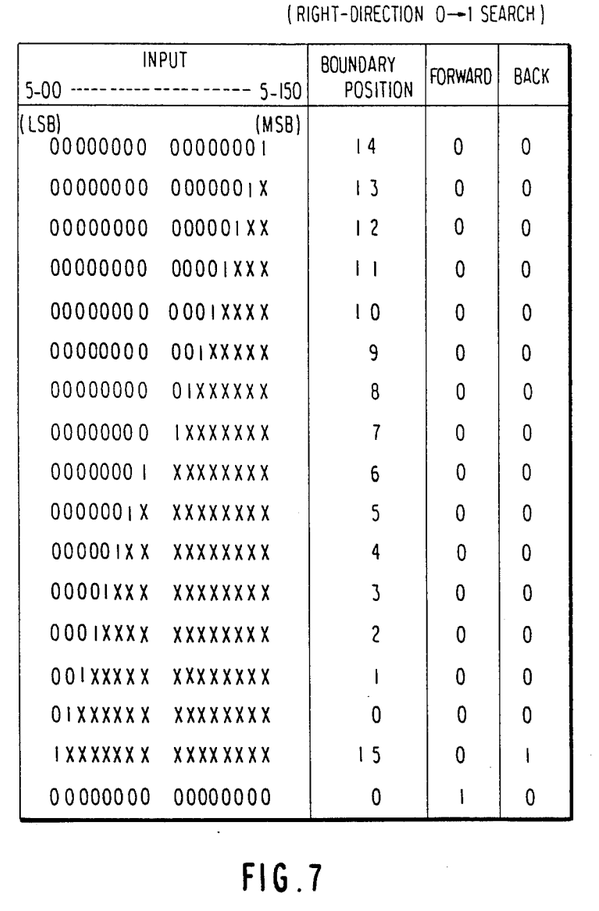
Figure 8:
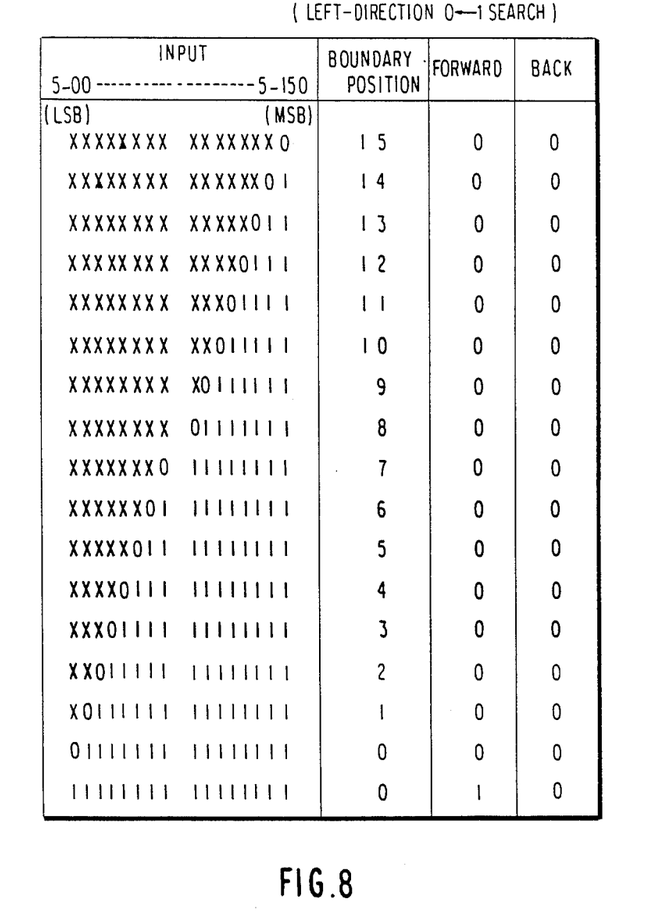
Figure 9:
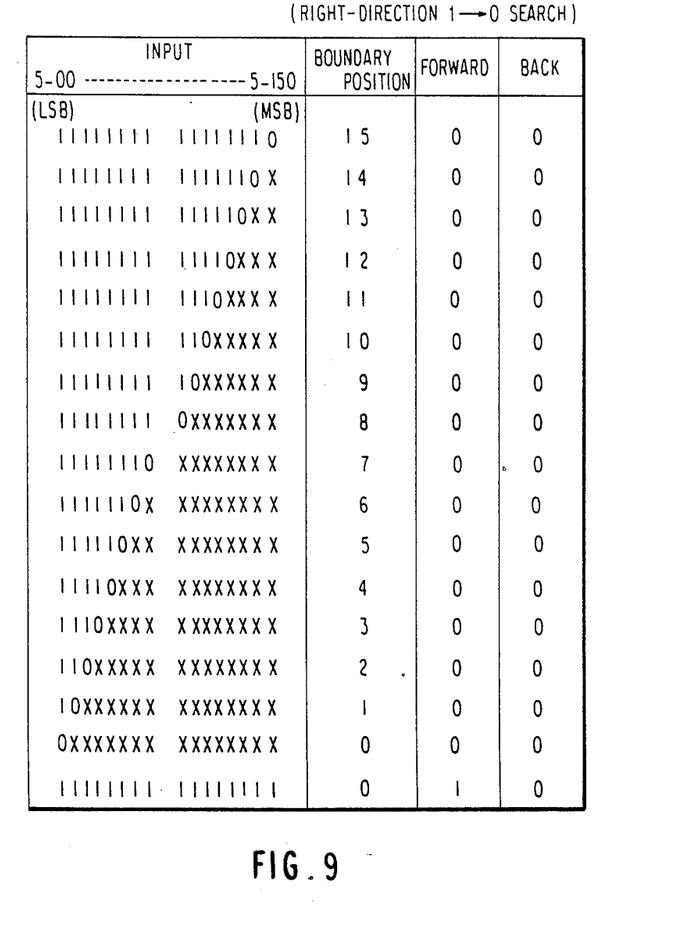

In FIG. 5, each of circular marks disposed at intersections of row signal lines and column signal lines represents an electrical connection therebetween. Each of two NAND gates NA, each of two NOR gates NO, each of eighteen AND gates AN1 and each of fifteen OR gates OR respectively execute a NAND operation, a NOR operation, an AND operation and an OR operation with respect to a plurality of inputs denoted by the circular marks. Each of transfer gates TG is controlled by the searching-direction control data 61 and 62, a two-to-four decoder 69 and four AND gates AN2. Thus, when the searching-direction control data 61 and 62 are "00", a first relationship shown in FIG. 6 is derived between the input data 5-00 to 5-150 from the mask gates 5-0 to 5-15 and the output data including the boundary position information 63-66, forward information 67 and back information 68. When the control data 61 and 62 are "01", a second relationship shown in FIG. 7 is derived. A third relationship shown in FIG. 8 is obtained in response to the control data 61 and 62 of "10", and a fourth relationship shown in FIG. 9 is obtained in response to the control data 61 and 62 of "11". More specifically, in FIG. 6, a position of a bit just before a bit taking logic "1" first in the bit arrangement order from the most significant bit (MSB) input 5-150 to the least significant bit (LSB) input 5-00 is outputted as the boundary position information. However, when the MSB input 5-150 takes logic "1", the boundary position information of "0" and the back information of "1" are generated. This means that the boundary locates on the least significant bit (LSB) of the word which was processed just therebefore When all the bit inputs 5-00 to 5-150 are "0", the boundary position information takes data "0" and the forward information of "1" is generated to represent that the boundary is present in a word which will be processed thereafter. In FIG. 7, a position of a bit just before a bit taking logic "1" first in the bit arrangement order from the LSB input 5-00 to the MSB input 5-150 is outputted as the boundary position information. However, when the LSB input 5-00 takes logic "1", the content of the boundary position information is "15" and the back information takes logic "1". This means that the boundary locates on the most significant bit (MSB) of the word which was processed just therebefore. When all the bit inputs 5-00 to 5-150 are logic "0", the forward information of "1" is generated. In FIG. 8, a position of a bit taking logic "0" first in the bit arrangement order from the MSB input 5-150 to the LSB input 5-00 is outputted as the boundary position information. In FIG. 9, a position of a bit taking logic "0" first in the bit arrangement order from the LSB input 5-00 to the MSB input 5-150 is outputted as the boundary position information. However, in FIGS. 8 and 9, when all the bits 5-00 to 5-150 take logic "1", the content of the boundary position information is "0" and the forward information of "1" is generated. It should be noted in FIGS. 6 to 9 that the bit inputs denoted by an "X" mark can take either logic "1" or logic "0".

In the data detecting operation of the searching start bit, the sequencer 1 supplies the searching-direction control data 61 and 62 of "00" to the position information generator 6. Accordingly, the generator 6 generates the information 63-68 in accordance with the relationship shown in FIG. 6. Assuming that the position of the searching start bit is "A" and the data thereof is logic "1", only the 11th mask gate output 5-100 takes logic "1". Therefore, the content of the boundary position information takes "11". At this time, the forward information 67 and the back information 68 are both logic "0". These information are supplied to the sequencer 1 which thereby regards the searching start bit as locating on the boundary of the area to be painted and terminates the boundary searching operation. The sequencer 1 requires a new searching start bit to the host processor. On the other hand, in case when the address (a, b) of the search-start bit S is given inside the area 101 as shown in FIG. 10A, the data of the searching start bit S is logic "0". Accordingly, the content of the boundary position information 63-66 is "0" and the forward information 67 of logic "1" is derived. Thus, the sequencer 1 starts to search a changing point of bit data from the logic "0" to the logic "1" in the left direction of the searching start bit S. This search is called hereinafter "left-direction 1←0 search". In this search, the sequencer 1 generates the logic control signal 55 of logic "1" and the search-direction control data 61 and 62 of "00". The left-direction 1←0 search is executed in accordance with the following procedure:

(1-1) It is detected whether or not a bit taking logic "1" is present between the least significant bit (LSB) and the searching start bit S of the word including the searching start bit S. To this end, the sequencer 1 writes data "0" into the first mask register 2 and the position data of the searching start bit into the second mask register 3. Assuming that the position data is "A", the mask information generated by the mask information generator 4 is "1111 1111 1110 0000", as apparent from FIGS. 3A and 3B. Namely, the mask information bits 4-B to 4-F take the mask data "0" and the remaining bits 4-0 to 4-A take non-mask data "1". Since a fact that the data of the searching start bit S is "0" has been recognized by the above-mentioned search-start bit data detecting operation, the second mask register 3 may be written with data "9". In this case, the mask information becomes "1111 1111 1100 0000". The data 4-0 to 4-F of mask information are supplied to the mask gates 5-0 to 5-15, respectively. Therefore, only the mask gates 5-0 to 5-10 (or 5-9) output the associated bit data $MD_0$ to $MD_A$ (or $MD_9$) supplied from the display memory controller 7. The remaining bits data are not outputted, and the mask gate outputs 5-110 (or 5-100) to 5-150 are held at logic "0". In an example shown in FIG. 10, all the bit data $MD_0$ ro $MD_F$ of a word $W_{a,c}$ including the searching start bit S are logic "0" as shown in FIG. 10B, and therefore all the mask gate outputs 5-00 to 5-150 take logic "0". As a result, the content of the boundary position information 63-66 becomes "0" and the forward information 67 takes logic "1".

(1-2) Since the boundary is not present between the LSB and the searching start bit of the word $W_{a,c}$, the sequencer 1 instructs the display memory controller 7 to read a word $W_{a,c-1}$ adjacent leftward to the word $W_{a,c}$ from the display memory 8. Moreover, the sequencer 1 writes the data "0" into the first mask register 2 and the data "F" into the second mask register 3. All the mask information bits 4-0 to 4-F thereby take the nonmask data "1". Therefore, the mask gates 5-0 to 5-15 output all the data of the read-out word $W_{a,c-1}$. Since all the bit data of the word $W_{a,c-1}$ are logic "0" as shown in FIG. 10B, the position information generator 6 generates the boundary position information 63-66 of "0" and the forward information 67 of "1".

(1-3) Since the boundary is also absent in the word $W_{a,c-1}$, the sequencer 1 instructs the display memory controller 7 to read the data of a word $W_{a,c-2}$ adjacent leftward to the word $W_{a,c-1}$ from the display memory 8. The contents of the mask registers 2 and 3 are not rewritten.

(1-4) When a word $W_{a,c-n}$ including boundary information is read from the display memory 8, the mask gate outputs 5-00 to 5-150 become "XXXX XXXX XXXX XX10". As a result, the position information generator 6 generates the boundary position information 63-66 of "15", as shown in FIG. 6. At this time, the data of the forward and back information 67 and 68 are both logic "0". Thus, the sequencer 1 recognizes that the most significant bit (MSB) of the word $W_{a,c-n}$ is a left-hand boundary address (a, i+1) in the one horizontal line $L_a$ of the painting area 101. The left-hand boundary address (a, i+1) is different by one bit from the address (a, i) of the figure 100. The left-direction 1←0 search in the line $L_a$ is thereby completed.

The sequence 1 thereafter executes a searching operation for detecting a changing point of bit data from logic "0" to logic "1" in the right direction of the searching start bit S. This searching operation is called hereinafter "right-direction 0→1 search". In this search, the logic control signal 55 is maintained to logic "1" and the search-direction control data 61 and 62 are changed to "01". Therefore, the input and output data relationship of the generator 6 is represented by FIG. 7. The procedure of the right-direction 0→1 search is as follows:

(2-1) The word $W_{a,c}$ including the searching start bit S is read from the display memory 8. The first mask register 2 is rewritten with the data "A" or "B" and the second mask register 3 is rewritten with the data "F". As a result, the mask information becomes "0000 0000 0011 1111" (or "0000 0000 0001 1111"). That is, the mask information bits 4-0 to 4-A (or 4-B) take the mask data "0". Therefore, the mask gates 5-10 (or 5-11) to 5-15 output the associated bit data of the word $W_{a,c}$. Since all the bit data of the word $W_{a,c}$ are logic "0" in the example shown in FIG. 10, all the mask gate outputs 5-00 to 5-150 take logic "0". Accordingly, the content of the boundary position information 63-66 becomes "0" and the forward information 67 becomes logic "1".

(2-2) Since the boundary is not present between the search-start bit S and the most significant bit (MSB) of the word $W_{a,c}$, the sequencer 1 instructs the memory controller 7 to read a word $W_{a,c+1}$ adjacent rightward to the word $W_{a,c}$ from the display memory 8 and writes the data "0" and "F" into the mask registers 2 and 3, respectively. Accordingly, all the mask information bits 4-0 to 4-F take the non-mask data "1", and all the bit data of the word $W_{a,c+1}$ are outputted from the mask gates 5-0 to 5-15. Since each bit of the word $W_{a,c+1}$ is logic "0", the generator 6 generates the boundary position information 63-66 representative of "0" and the forward information of logic "1".

(2-3) Since the boundary is also absent in the word $W_{a,c+1}$, the data of a word $W_{a,c+2}$ adjacent rightward to the word $W_{a,c+1}$ is read from the display memory 8. The contents of the mask registers 2 and 3 are not changed. Since each bit data of the word $W_{a,c+2}$ is logic "0", the right-direction 0→1 search is advanced.

(2-4) When a word $W_{a,c+n}$ including boundary information is read out of the display memory 8, the mask gate outputs 5-00 to 5-150 become "1XXX XXXX XXXX XXXX". As a result, the generator 6 generates the boundary position information 63-66 representative of "15" and the back information 68 taking logic "1". Since the back information of logic "1" is generated, the boundary position information "15" represents the most significant bit (MSB) of a word $W_{a,c+n-1}$ adjacent leftward to the word $W_{a,c+n}$. That is, the sequence 1 recognizes that the most significant bit (MSB) of the word $W_{a,c+n-1}$ is a right-hand boundary address (a, l) in the line $L_a$ of the painting area 101. This address (a, l−1) is different by one bit from the figure address (a, l). The right-direction 0→1 search in the line $L_a$ is thereby completed.

Thus, the left-hand boundary address (a, i+1) and the right-hand boundary address (a, l−1) are searched in the one horizontal line $L_a$ of the painting area 101.

Since the search of the left-hand and right-hand boundary addresses (a, i+1) and (a, l−1) in the line $L_a$ is completed, the boundary searching operation is executed with respect to other lines including lines $L_{a+1}$ and $L_{a-1}$ which locate above and under the line $L_a$, respectively, in the same manner as described above. More specifically, a word $W_{a+1,c}$ (or a word $W_{a-1,c}$) is read from the display memory 8 and the left-direction 1←0 search is executed with respect to bits and words arranged in the left direction of the bit of the read-out word $W_{a+1,c}$ (or $W_{a-1,c}$) having the same column address as the searching start bit S. When this search is completed, the right-direction 0→1 search is executed.

As shown in FIG. 10D, the painting area 101 has a concave shape. That is, as the data map in a horizontal line $L_b$ of the area 101 is shown in FIG. 10C, all the bits defining one portion 100-1 of the closed line figure 100 take logic "1", so that four boundary addresses (b, i+1), (b, j−1), (b, k+1) and (b, l−1) are present in the line $L_b$. For this reason, if these boundary addresses are intended to be detected only by the left-direction 1←0 search and the right-direction 0→1 search, the boundary searching operation is required to be executed twice with respect to each of words in the line $L_b$.

In order to solve this problem, the boundary searching circuit shown in FIG. 1 can execute a left-direction 0←1 search for searching a changing point of bit data from logic "1" to logic "0" in a left direction of a bit arrangement and a right-direction 1→0 search for searching a changing point of bit data from logic "1" to logic "0" in a right direction of a bit arrangement. In these searches, the logic control signal 55 is changed to "0" level, so that the transfer gates 52 and 53 (see FIG. 4) are turned OFF and ON, respectively. Therefore, each of the mask gates 5-0 to 5-15 holds its outputs to logic "1" when the associated mask information bit takes the mask data "0". In the left-direction 0←1 search, the search-direction control data 61 and 62 are set to "10", so that the generator 6 takes the input and output data relationship shown in FIG. 8. In the right-direction 1→0 search, the control data 61 and 62 of "11" are supplied to obtain the relationship shown in FIG. 9.

When a word is read which is arranged in the same column as the word $W_{a,c}$ including the searching start bit S, the left-direction 0←1 search is executed by masking the data from the MSB to a bit of the same column address as the searching start bit S. Assuming that the column address of the searching start bit S is "A", the first and second mask registers 2 and 3 are written with the data "0" and "9", respectively. Since all the bits of the read word take logic "1", the generator 6 generates the boundary position information 63-66 of "0" and the forward information 67 of logic "1". The left-direction 0←1 search is thereby executed with respect to each of words arranged in the left direction. At this time, the mask registers 2 and 3 are written with the data "0" and "F" in order that each of the mask information bits 4-0 to 4-F takes the non-mask data "1". When a word $W_{b,d}$ including boundary information representative of the second boundary address (b, j−1) is read, the mask gate outputs 5-00 to 5-150 become "0000 0000 0000 0111". Therefore, the content of the boundary position information 63-66 becomes "12" and the forward and back information 67 and 68 take both logic "0", as shown in FIG. 8. Thus, the sequencer 1 recognizes that the twelfth bit of the word $W_{b,d}$ is the second boundary address (b, j−1). Since the second boundary address (b, j−1) is detected, the sequencer 1 executes the left-direction 1←0 search with respect to each words arranged in the left direction of the word $W_{b,d}$ to detect the first boundary address (b, i+1).

After the first and second boundary addresses (b, i+1) and (b, j−1) are detected, the sequencer 1 reads again the word arranged in the same column as the word $W_{a,c}$ and then executes the right-direction 1→0 search by masking data from the LSB to the ninth bit. The mask registers 2 and 3 are therefore stored with the data "A" and "F", respectively. Since all the bit data of the read word are logic "1", the information 63-66 of "0" and the forward information 67 of "1" are derived. The right-direction 1→0 search is repeated with respect to each of words arranged in the right direction. At this time, the registers 2 and 3 are stored with the data "0" and "F" to obtain the non-mask data "1" from all the mask information bits 4-0 to 4-F. When a word $W_{b,e}$ including boundary information representative of the third boundary address (b, k+1) is read from the display memory 8, the mask gate outputs 5-00 to 5-150 become "1110 0000 0000 0000". Thus, the content of the boundary position information 63-66 takes "4" and both of the forward and back information 67 and 68 take logic "0". That is, the sequencer 1 recognizes that the fourth bit of the word $W_{b,e}$ is the third boundary address (b, k+1). Since this boundary address (b, k+1) is detected, the right-direction 0→1 search is executed with respect to the words arranged in the right direction to search the fourth boundary address (b, l−1). Thus, four boundary points addresses (b, i+1), (b, j−1), (b, k+1) and (b, l−1) are searched without executing the boundary searching operation twice with respect to each of words in the line $L_b$.

As described in detail, the boundary searching circuit according to the present invention requires no bit-shift instruction and outputs immediately information representing whether or not the read-out word includes a boundary of an area to be painted.

The present invention is not limited to the above embodiments, but can be modified and changed without departing from the scope and spirit of the present invention. For example, the mask information generator 4 and the position information generator 6 can be constructed by the combination of various gates. Also in case where an area to be painted is defined by a closed line consisting of a string of bit data "0" and all bit data inside the area are logic "1", the boundary thereof is detected by employing mainly the left-direction 0←1 search and the right-direction 1→0 search. The data of two or more words may be detected simultaneously.

What is claimed is:

1. A graphics display controller for searching a boundary of a desired display area stored in a display memory, said boundary of said desired display area being defined by a plurality of bits each having display data of a first logic level and all bits within said desired display area having display data of a second logic level, said controller comprising means for accessing said display memory to produce display data consisting of N bits in parallel, said N being an integer more than one, means for temporarily storing control data, means coupled to said storing means and responsive to said control data for generating mask information consisting of said N bits in which M bits take mask data and the remaining bit or bits take non-mask data, said M being an integer from 0 to N−1, means coupled to said accessing means and said generating means to receive said display data and said mask information for outputting intermediate data consisting of said N bits in parallel, each bit of said intermediate data taking the same data as data of the associated bit of said display data when the associated bit of said mask information takes said non-mask data and taking said second logic level irrespective of data of the associated bit of said display data when the associated bit of said mask information takes said mask data, and means coupled to said outputting means to receive said intermediate data for producing first output information representative of the absence of said boundary when all the bits of said intermediate data take said second logic level and for producing second output information representative of the presence of said boundary when at least one bit of said intermediate data takes said first logic level, said second output information including bit position information relative to a position of a bit that takes said first logic level and is closest to one of the least and most significant bit positions of said intermediate data.

2. The controller as claimed in claim 1, wherein said control data determines the number of said M bits and/or the position of each of said M bits.

3. The controller as claimed in claim 2, wherein said mask information generating means includes a memory receiving said control data as address information and means for generating said mask information in response to data read from said memory.

4. A graphics display controller for searching a boundary of a desired display area stored in a display memory, said boundary of said desired display area being defined by a plurality of bits each taking a predetermined logic level and all bits within said desired display area taking an opposite logic level to said predetermined logic level, said controller comprising means for temporarily storing mask control data, a mask information generator coupled to said storing means and generating mask information consisting of a plurality of bits in response to said mask control data, each bit of said mask information taking one of mask data and non-mask data, means for accessing said display memory to produce one word display data consisting of a plurality of bits, a set of mask gates, each of said mask gates receiving the associated bit data of said one work display data and the associated bit data of said mask information, each of said mask gates outputting the associated bit data of said one word display data when the associated bit data of said mask information is said non-mask data and outputting a first logic level irrespective of the associated bit data of said one word display data when the associated bit data of said mask information is said mask data, and a position information generator coupled to said set of mask gates to receive output data derived therefrom, said position information generator generating first output information representative of the absence of said boundary when all bits of said output data take said first logic level and generating second output information representative of the presence of said boundary when at least one bit of said output data takes a second logic level, said second output information including boundary position information relative to a position of a bit that takes said second logic level and is closest to one of the least and most significant bit positions of said output data.

5. The controller as claimed in claim 4, wherein said boundary position information generated by said position information generator represents a position of a bit which is more significant by one than the bit taking said second logic level and being closest to said most significant bit position.

6. The controller as claimed in claim 4, wherein said boundary position information generated by said position information generator represents a position of a bit which is less significant by one than the bit taking said second logic level and being closest to said least significant bit position.

7. The controller as claimed in claim 4, wherein said boundary position information generated by said position information generator represents a position of the bit taking said second logic level and being closest to said most significant bit position.

8. The controller as claimed in claim 4, wherein said boundary position information generated by said position information generator represents a position of the bit taking said second logic level and being closest to said least significant bit position.

* * * * *

UNITED STATES PATENT AND TRADEMARK OFFICE
CERTIFICATE OF CORRECTION

| | | |
|---|---|---|
| PATENT NO. | : | 4,943,801 |
| DATED | : | July 24, 1990 |
| INVENTOR(S) | : | Tetsuji OGUCHI |

It is certified that error appears in the above-identified patent and that said Letters Patent is hereby corrected as shown below:

Col. 1, line 40, delete "includes" and insert --include--.

Col. 6, line 45, delete "ro" and insert --to--.

Signed and Sealed this

Twelfth Day of November, 1991

Attest:

HARRY F. MANBECK, JR.

*Attesting Officer*    *Commissioner of Patents and Trademarks*